United States Patent
Skinner

(10) Patent No.: US 7,434,067 B1
(45) Date of Patent: Oct. 7, 2008

(54) METHOD AND SYSTEM FOR A SECURITY TECHNIQUE FOR ENABLING AN ELECTRONIC DEVICE TO RUN CONTROLLED TEST APPLICATIONS

(75) Inventor: Craig S. Skinner, Snohomish, WA (US)

(73) Assignee: PalmSource, Inc., Sunnyvale, CA (US)

( * ) Notice: Subject to any disclaimer, the term of this patent is extended or adjusted under 35 U.S.C. 154(b) by 506 days.

(21) Appl. No.: 09/844,924

(22) Filed: Apr. 26, 2001

(51) Int. Cl.
G06F 21/00 (2006.01)

(52) U.S. Cl. ............... 713/193; 726/2; 726/4; 726/7; 726/17; 726/21; 726/26; 726/27; 726/29

(58) Field of Classification Search ......... 713/201, 713/182, 200, 193; 380/4; 235/382; 726/2, 726/4, 7, 17, 21, 27, 29, 26
See application file for complete search history.

(56) References Cited

U.S. PATENT DOCUMENTS

| | | | | |
|---|---|---|---|---|
| 4,961,224 A | * | 10/1990 | Yung | 726/4 |
| 5,867,646 A | * | 2/1999 | Benson et al. | 726/4 |
| 5,933,497 A | * | 8/1999 | Beetcher et al. | 705/59 |
| 6,263,445 B1 | * | 7/2001 | Blumenau | 726/2 |
| 6,317,742 B1 | * | 11/2001 | Nagaratnam et al. | 707/9 |
| 6,351,817 B1 | * | 2/2002 | Flyntz | 726/4 |
| 6,425,084 B1 | * | 7/2002 | Rallis et al. | 713/185 |
| 6,526,512 B1 | * | 2/2003 | Siefert et al. | 713/200 |
| 6,701,349 B1 | * | 3/2004 | Cromer et al. | 709/207 |
| 6,921,336 B1 | * | 7/2005 | Best | 463/32 |
| 2002/0078367 A1 | * | 6/2002 | Lang et al. | 713/200 |
| 2002/0133716 A1 | * | 9/2002 | Harif | 713/201 |

* cited by examiner

Primary Examiner—Carl Colin
(74) Attorney, Agent, or Firm—Berry & Associates P.C.

(57) ABSTRACT

A method and system for implementing a security technique enables an electronic device to run controlled test applications. An enabler application sets up specific devices as testing devices by encrypting the serial number of the device and an assigned authorization level and storing these encrypted values on the device. A test application that has controlled attributes is allowed to run on any device that has been correctly enabled with an authorization level that is of an equal or higher value than the authorization level assigned to the test application.

10 Claims, 8 Drawing Sheets

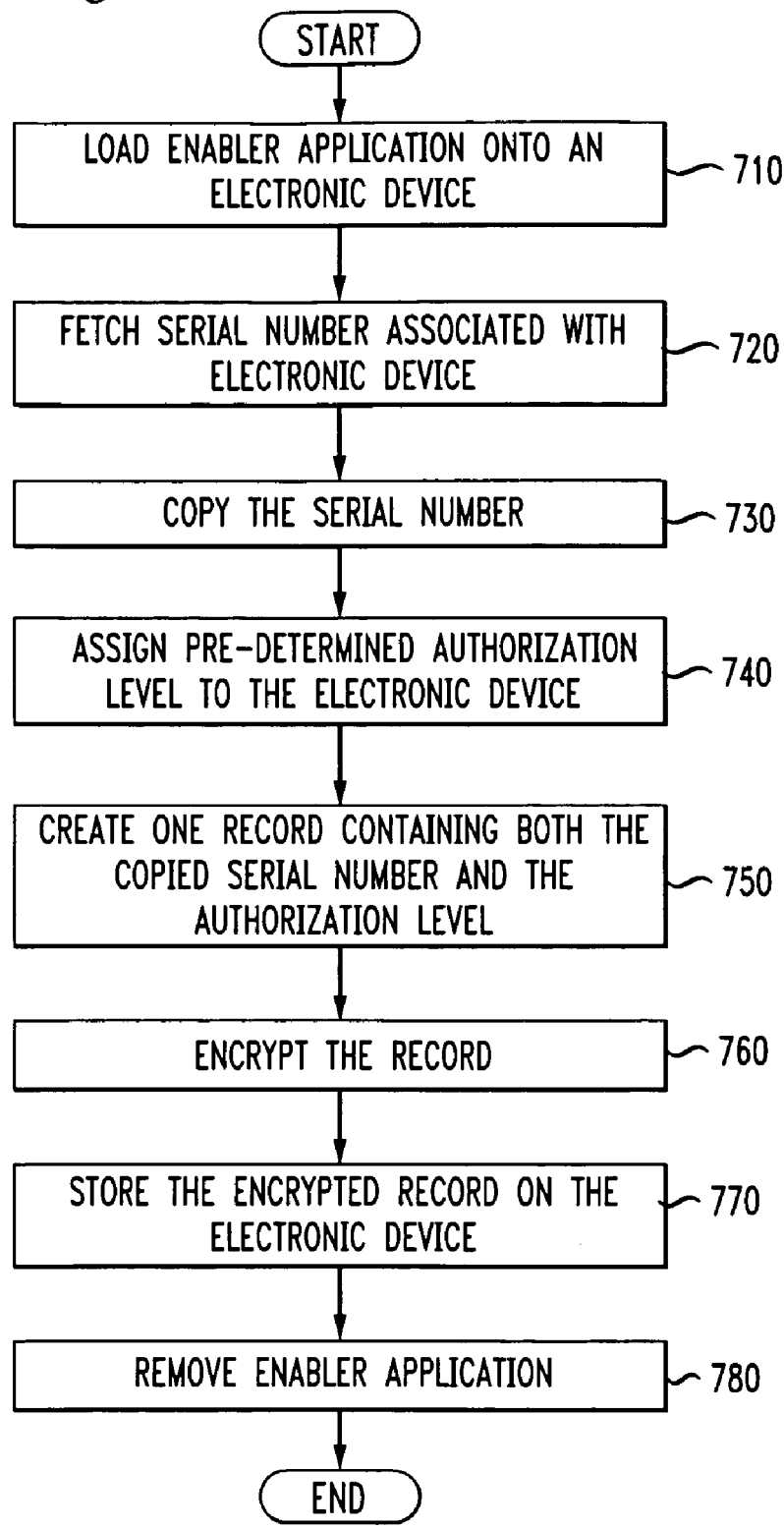

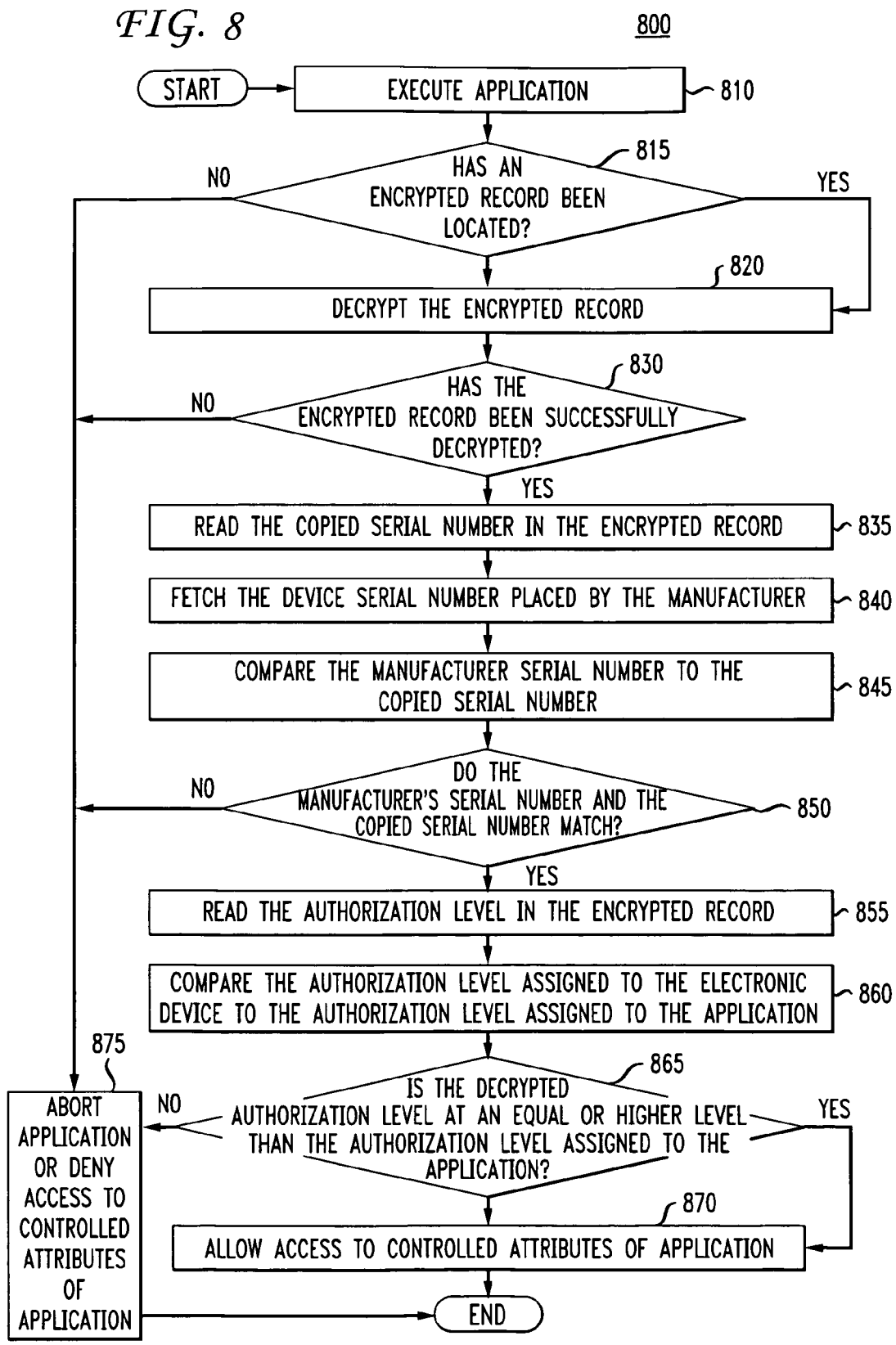

METHOD AND SYSTEM FOR A SECURITY TECHNIQUE FOR ENABLING AN ELECTRONIC DEVICE TO RUN CONTROLLED TEST APPLICATIONS

BACKGROUND OF THE INVENTION

1. Field of the Invention

The present invention relates to the field of security protocols. Specifically, the present invention relates to the field of encryption/decryption protocols used for enabling test devices to run test applications.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers also provide wireless communication services, such as, voice communication, Internet access, e-mail, text messaging, etc. Palmtop computers have been known as Personal Digital Assistants (hereinafter referred to as "PDAs").

Integration of the palmtop computer system into a wireless communication network necessitates the use of powerful testing applications on test devices. These testing applications are implemented for purposes of testing various other applications, products, and the interoperability of the product device or application within a communication network. Test applications and devices have also been known as "backdoor" applications and backdoor devices since they can bypass normal security measures, such as, device locking passwords.

Tight control of these backdoor applications are necessary since they allow the manipulation of settings on a device. In the wrong hands, a backdoor application could reconfigure any device in order to gain complete access to radio or wireless communication networks. Outside of test environments, this access could, at the very worst, deleteriously disable a communication network because of the inability of the network to handle this erroneous traffic. Furthermore, backdoor applications introduce the capability of illegal network traffic, which results in lost earnings and costs to try to mitigate the illegal traffic.

Unfortunately, previous mechanisms used to control access to the backdoor application have proved unsuccessful. Physical restriction or tight control of the backdoor application proved difficult to manage; especially, since testing environments sometimes necessitate wide distribution of the backdoor application. For example, third parties outside of a controlling company may need access to the backdoor application. Once the backdoor application was put in the hands of a person that was not heavily controlled, either third parties or in-house employees, the backdoor application could easily be distributed to uncontrolled sources. Because the backdoor application was software based, the backdoor application then could easily be copied and widely distributed.

Various other unsuccessful means of controlling backdoor applications included passwords and time control mechanisms. The password mechanism only allowed users who knew the password access to the backdoor application. Unfortunately, the password still had to be distributed in order to use the backdoor application and was subject to the same distribution and control problems as when restricting physical access of the backdoor application. Essentially, the wider the distribution of the password, the more likely the chance the password would be leaked to uncontrolled sources. Again, the backdoor application, along with the password, then could easily be copied and widely distributed.

Further, a time control mechanism could be implemented independent of, or in conjunction with a password. The time control mechanism essentially sets a window of time that a backdoor application could be used. Unfortunately, the window of time was in relation to the time on a device. As such, when a window of time expired, a simple cure to allow a user to continue to use the backdoor application would be to back date the device to fit within the window. As a result, the strict control of the backdoor application via a time control mechanism also failed, and the backdoor application still could easily be copied, widely distributed, and used for deleterious purposes.

Thus, the various security means for controlling backdoor applications have previously failed to mitigate the damage due to the illegal distribution and use of these backdoor applications. Passwords, time control mechanisms, and strict restrictive control of the backdoor application have proven unsuccessful in curbing the copying and wide distribution of the backdoor application to uncontrolled third parties. This wide distribution has led to illegal use of radio and wireless traffic and has resulted in deleterious damage to the wireless communication network.

SUMMARY OF THE INVENTION

Accordingly, embodiments of the present invention provide a more effective method to control the use of backdoor or test applications. Embodiments also provide for eliminating unwanted traffic on wireless networks through the illegal distribution of backdoor or test applications. Still other embodiments provide for maintaining the integrity of a wireless communication network. These and other objects and advantages of the present invention will no doubt become obvious to those of ordinary skill in the art after having read the following detailed description of the preferred embodiments which are illustrated in the various drawing figures.

Specifically, embodiments of the present invention disclose a method and system for implementing a security technique that enables an electronic device to run controlled test applications. In one embodiment, an enabler application sets up specific devices as testing devices by encrypting the serial number of the device and an assigned authorization level and storing these encrypted values on the device. A test application that has controlled attributes is allowed to run on any device that has been correctly enabled with an authorization level that is of an equal or higher value than the authorization level assigned to the test application.

In one embodiment of the present invention, an enabler application enables a device as a testing or backdoor device. The enabler application reads the serial number of the backdoor device that is unique to the device. The serial number is located on the backdoor device as a flash record that is locked. The enabler application copies the serial number, forming a copied serial number.

Previously an authorization level has been assigned to the electronic device. The copied serial number and the authorization level of the electronic device are stored together in a single record. This record is encrypted by the enabler application using an encryption/decryption protocol, forming an encrypted record. This encrypted record is stored as a flash record on the electronic device. It is also envisioned that the encrypted record is stored as a flash record that is locked.

The copied serial number and the authorization level are encrypted as one record as a preemptive security measure. Having only one record that is encrypted prevents the copying of a valid authorization level from one device to another device that has a lower authorization level.

Testing applications that have controlled attributes can run on any device that has been correctly enabled and satisfies the necessary authorization level. Testing applications also have been known as backdoor applications.

Upon executing the backdoor or testing application on an enabled device, the backdoor application will attempt to locate the encrypted record that is stored on the device. The backdoor application then will decrypt the encrypted record using the same or similar encryption/decryption protocol as used by the enabler application. The backdoor application then will read the copied serial number and the authorization level from the encrypted record that has been decrypted.

The backdoor application also fetches the serial number of the device that is executing the application. The serial number is unique to the electronic device and was originally stored on the device upon manufacturing. The backdoor application then compares the copied serial number read from the encrypted record that was decrypted with the serial number of the electronic device.

If the copied serial number and the serial number of the electronic device match, then the backdoor application reads the authorization level that is stored in the encrypted record. Previously this encrypted record has been decrypted. Also, this authorization level has been previously assigned to the electronic device and allows the device to run controlled applications that have authorization levels equal to or lower than that assigned to the electronic device.

The backdoor application then compares the authorization level of the electronic device with the authorization level that was assigned to the backdoor application. The backdoor application will allow access to the controlled attributes of the application, only if that device's authorization level is equal to or higher than the authorization level of the backdoor application.

If the backdoor application cannot successfully locate or decrypt the encrypted record that is stored on the device, then the backdoor application will either abort or deny access to its controlled attributes. Furthermore, if the serial number and the copied serial number do not match, then the backdoor application will either abort or deny access to its controlled attributes. Additionally, if the device's authorization level does not meet or exceed the authorization level assigned to the backdoor application, then the backdoor application will either abort or deny access to its controlled attributes.

BRIEF DESCRIPTION OF THE DRAWINGS

FIG. 7 is a flow diagram illustrating steps in a computer implemented method for enabling a device with an enabler application for running specific backdoor or test applications, in accordance with an embodiment of the present invention.

FIG. 8 is a flow diagram illustrating steps in a computer implemented method for verifying that a backdoor device has been correctly enabled to run a specific backdoor or test application, in accordance with an embodiment of the present invention.

DETAILED DESCRIPTION OF THE INVENTION

Figure 1A:
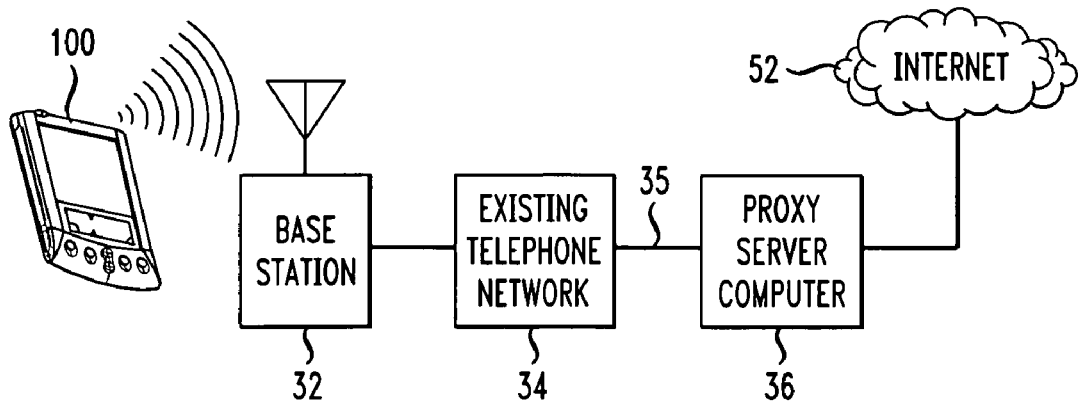
FIG. 1A illustrates a block diagram of a first exemplary network environment including a personal digital assistant, in accordance with an embodiment of the present invention.

Reference will now be made in detail to the preferred embodiments of the present invention, a method and system for a security technique for enabling a test device to run controlled test applications, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device running controlled applications. One of the common types of electronic systems which can be used in accordance with one embodiment of the present invention is referred to as a personal digital assistant (PDA), or commonly called a portable computer system, which may be a PDA. The PDA is a pocket sized electronic organizer with the capability to store telephone numbers, addresses, daily appointment, and software that keeps track of business or personal data such as expenses, etc.

Furthermore, the PDA also has the ability to connect to a personal computer, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
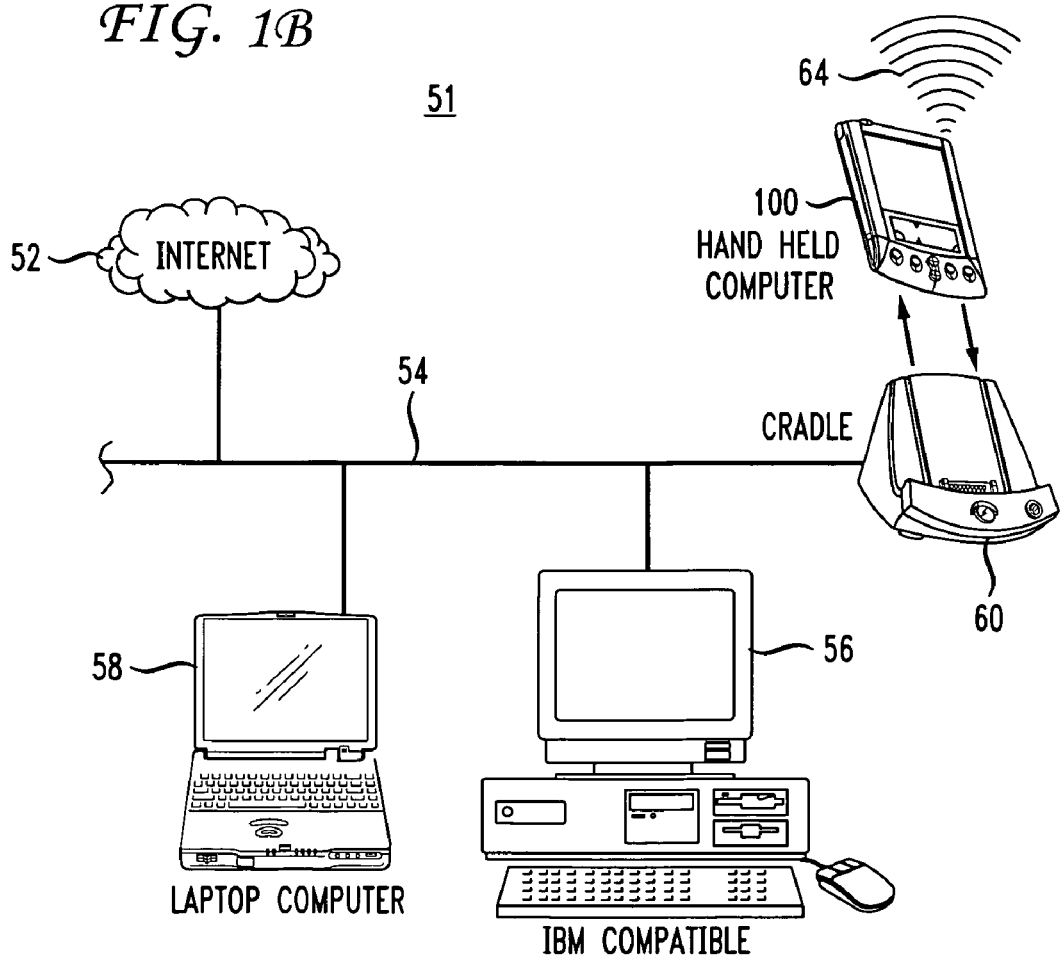
FIG. 1B illustrates a block diagram of a second exemplary network environment including a personal digital assistant coupled to other computer systems and the Internet via a cradle device, in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

Figure 2A:
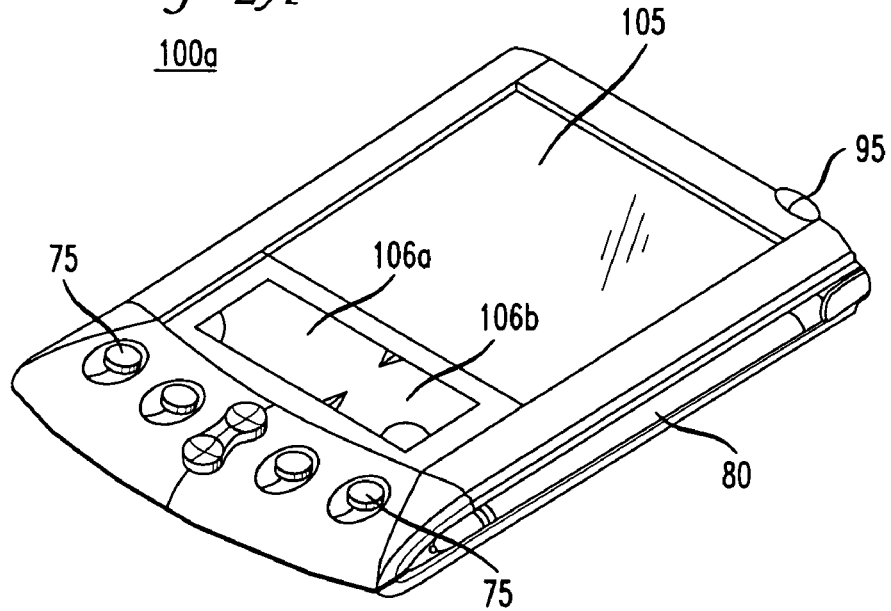
FIG. 2A is a top side perspective view of a palmtop computer system that can be used as a platform for the data entry and authentication embodiments of the present invention, in accordance with an embodiment of the present invention.

FIG. 2A is a perspective illustration of the top face 10a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
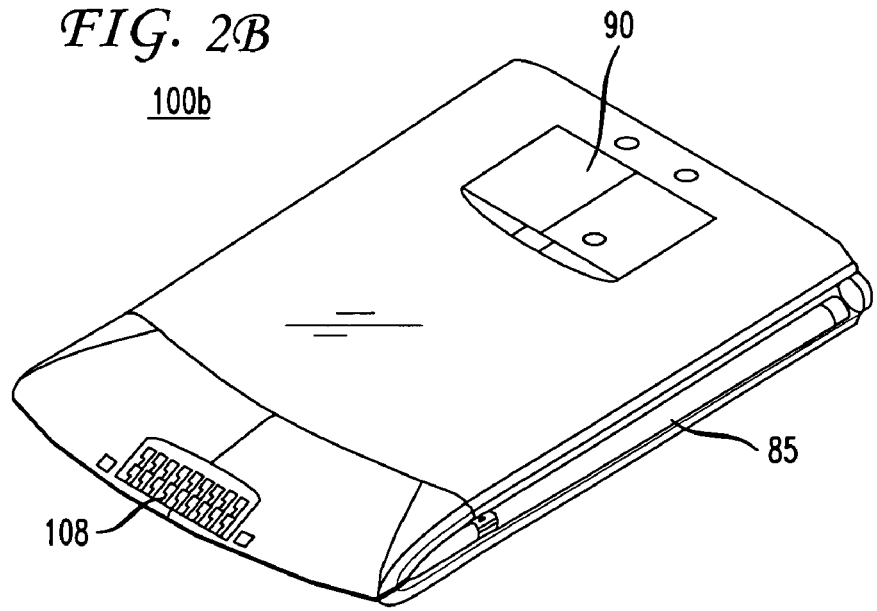
FIG. 2B is a bottom side perspective view of the palmtop computer system of FIG. 2A, in accordance with an embodiment of the present invention.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
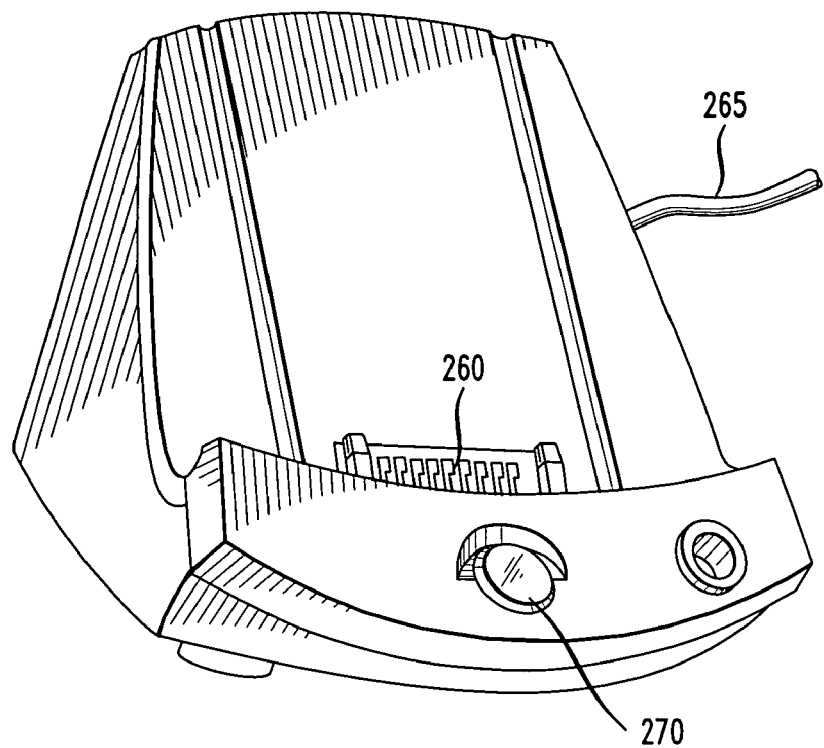
FIG. 3 is a perspective view of the cradle device for connecting the palmtop computer system to other systems via a communication interface, in accordance with an embodiment of the present invention.

FIG. 3 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 4:
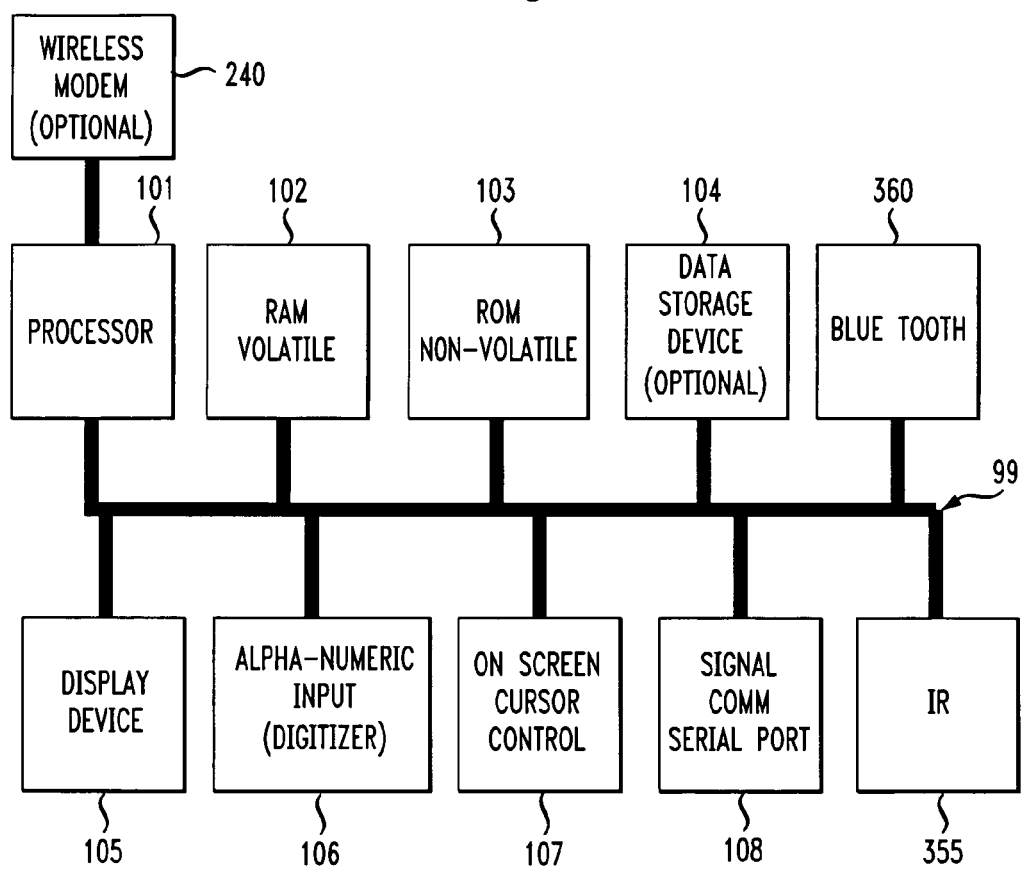
FIG. 4 is a logical block diagram of the palmtop computer system in accordance with an embodiment of the present invention.

Referring now to FIG. 4, portions of the present electronic system are comprised of computer-readable and computer-executable instructions which reside, for example, in computer-readable media of an electronic system (e.g., personal digital assistant, computer system, and the like). Although the functional faceplate of the present invention can be implemented in a variety of different electronic systems such as a pager, a cell phone, a remote control device, etc., one exemplary embodiment includes the integration of the faceplate with a portable electronic device or PDA. FIG. 4 is a block diagram of exemplary interior components of an exemplary personal digital assistant 100 upon which embodiments of the present invention may be implemented.

FIG. 4 illustrates circuitry of an exemplary portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

Computer system 100 also includes an optional data storage device 104 (e.g., thin profile removable memory) coupled with the bus 99 for storing information and instructions. Device 104 can be removable. Device 104 may also be an SDROM card reader or equivalent removable memory reader.

Also included in computer system 100 of FIG. 4 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101. En one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 for later analysis.

System 100 of FIG. 4 also includes an optional cursor control or directing device 107 coupled to the bus for communicating user input information and command selections to the central processor 101. In one implementation, device 107 is a touch screen device (e.g., a digitizer) incorporated with screen 105. Device 107 is capable of registering a position on the screen 105 where the stylus makes contact and the pressure of the contact. The digitizer of 106 or directing device 107 can be implemented using well known devices.

System 100 also contains a flat panel display device 105 coupled to the bus 99 for displaying information to the computer user. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with a cradle. In one embodiment, the signal communication device 108 is a serial communication port, but could also alternatively be of any of a number of well known communication standards and protocols, e.g., parallel, SCSI, Firewire (IEEE 1394), Ethernet, etc. In addition to device 108, wireless communication links can be established between the device 100 and a host computer system (or another portable computer system) using a Bluetooth wireless device 360, an infrared device 355, or a GSM radio device. Device 100 may also include a wireless modem device 240 and/or a wireless radio, e.g., a GSM wireless radio with supporting chipset. The wireless modem device 240 is coupled to communicate with the processor 101 but may not be directly coupled to signal communication device 108.

In one implementation, the Mobitex wireless communication system may be used to provide two way communication between system 100 and other networked computers and/or the Internet, e.g., via a proxy server. In other embodiments, TCP protocol can be used or SMS can be used. System 100 of FIG. 4 may also contain batteries for providing electrical power.

Enabling Backdoor Device to Run Controlled Test Applications

Although the description of the present invention will focus on an exemplary personal digital assistant (hereinafter referred to as "PDA") or palmtop computer system, the present invention can be practiced with other electronic systems or electronic devices (e.g. personal computer systems, cellular phones, pagers, portable web devices, etc.).

Figure 5:
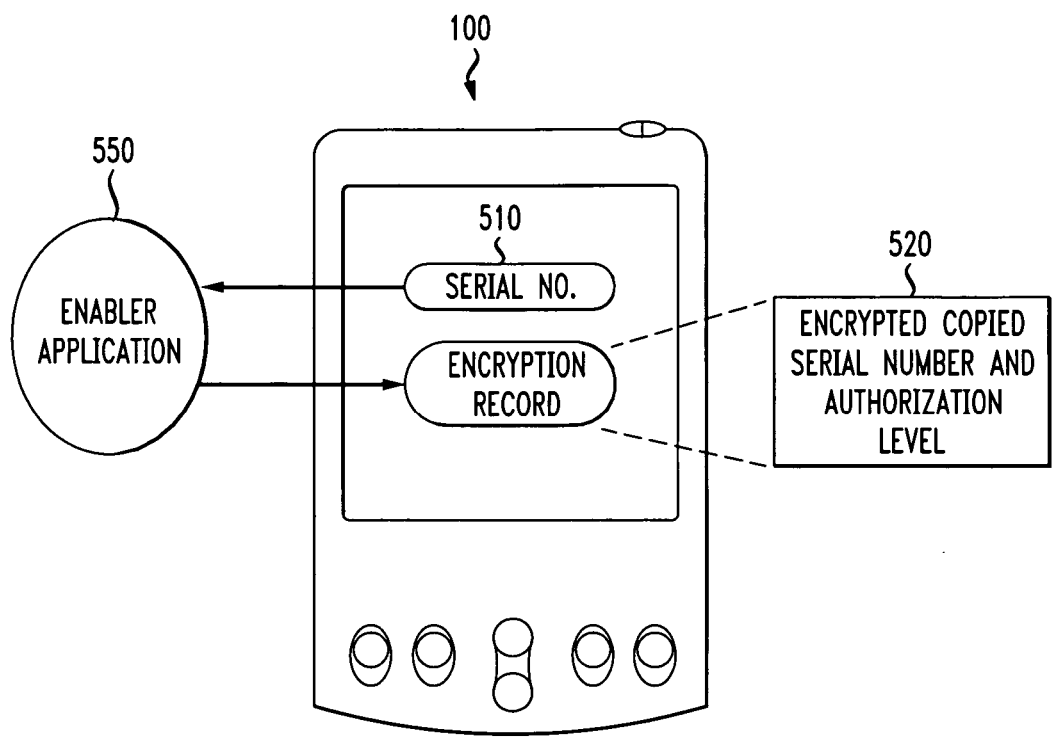
FIG. 5 illustrates a data-flow diagram illustrating the process of enabling a backdoor device with an enabler application, in accordance with an embodiment of the present invention.

FIG. 5 illustrates a data-flow diagram illustrating the process of enabling a backdoor device to run controlled applications with an enabler application, in accordance with one embodiment of the present invention. The controlled applications can be powerful test applications or backdoor applications that manipulate settings in the backdoor device. For example, the backdoor applications can bypass passwords, or clone devices. Although testing or backdoor applications are primarily used to describe embodiments of the present invention, it is appreciated that other embodiments of the present invention can be used to secure and control access to any type of application.

In one embodiment of the present invention, instead of trying to control the backdoor applications themselves, the control is shifted to the devices running the test applications. Although it is very difficult to control the distribution of the backdoor application, it is much more manageable to control access and distribution of backdoor devices. While backdoor applications can be easily copied and widely distributed, backdoor devices cannot be easily copied thereby limiting its wide distribution. Thus, uncontrolled outside sources that have obtained a valid backdoor application still will not be able to run the backdoor application without a properly enabled device.

Normal security procedures used to control distribution of physical objects can be used to track enabled devices. Further, rigid control of the enabler application 550, that is necessary for this security technique to succeed, is easily accomplished since the enabler application 550 does not directly interact with any backdoor application and can be removed from a device once that device has been enabled.

Continuing with FIG. 5, the enabler application 550 enables an electronic device 100 to run controlled applications. The enabler application 550 runs independently of any controlled application and acts solely to enable the electronic device 100. In fact, controlled applications, that are written after a device has been enabled, can be run on the device as long as the security protocol has been satisfied. Electronic device 100 is also known as a test device or a backdoor device, but can be any electronic device capable of implementing a encryption/decryption protocol and running controlled applications.

The enabler application 550 enables the electronic device 100 by reading the serial number 510 of the electronic device 100. The serial number 510 is unique to the device and stored in a secure area of memory of the electronic device 100 at the time of manufacturing the device. In one embodiment, the serial number 510 is stored in an area of locked flash memory. It is impossible to change the serial number 510 through normal operation of the electronic device.

The enabler application enables the electronic device 100 by encrypting the serial number 510 of the device and an assigned authorization level using an encryption/decryption protocol. First, the serial number of the electronic device 100 is copied, forming a copied serial number. The copied serial number and an authorization level that has been previously assigned to the electronic device 100 is stored in one record on device 100. The record is then encrypted using an encryption/decryption protocol, forming an encrypted record 520. This encrypted record containing the copied serial number and the authorization level of device 100 is stored in electronic device 100 in memory. In one embodiment, the encrypted record is stored in locked flash memory.

The copied serial number and the authorization level are encrypted as one record as a preemptive security measure. Having only one record that is encrypted prevents the copying of a valid authorization level from one device to another validly enabled device that has a lower authorization level.

Figure 6:
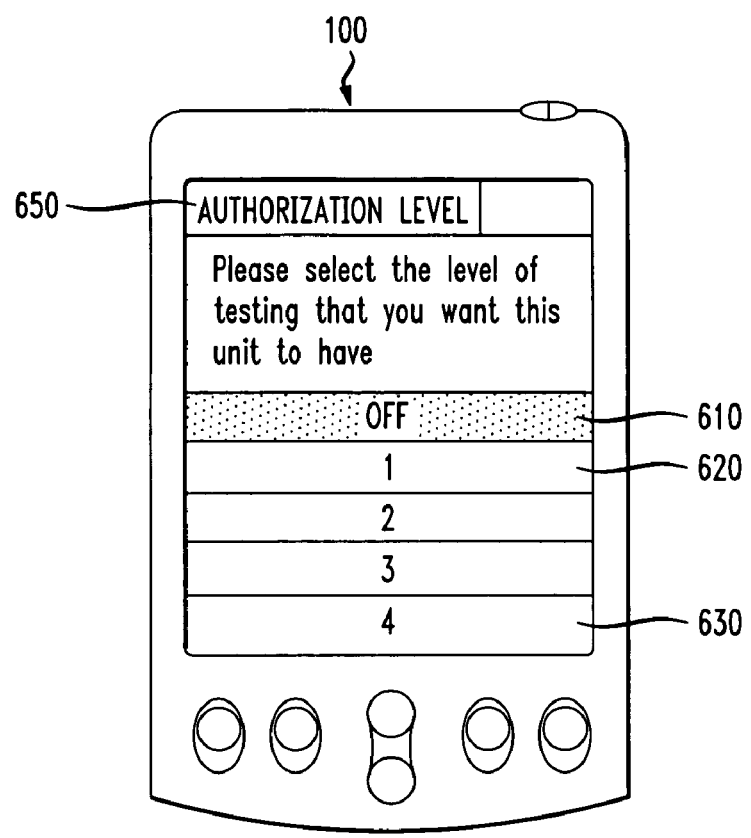
FIG. 6 is a front view of the personal digital assistant illustrating the display screen and an exemplary authorization level selection window, in accordance with an embodiment of the present invention.

FIG. 6 is a front view of the electronic device 100 illustrating the display screen and an exemplary authorization level selection window used by the enabler application 550, in accordance with an embodiment of the present invention. The authorization level window is represented by the title bar 650. The authorization level assigned to the electronic device 100, in a sense, sets the amount of authorization for gaining access to the settings within the electronic device. In another embodiment, the authorization levels set increasing priority levels of security.

Continuing with FIG. 6, the enabler application 550 allows a user of the application to select the authorization level assigned to the electronic device 100. In this embodiment, the enabler application 550 can assign four levels of authorization; however, it is appreciated that the number of levels are exemplary only, and that fewer or greater number of levels may exist.

In this embodiment, the enabler application 550 allows a user to select between the off bar 610 or four levels of authorization, one through 4. Bar 620 represents a selection of authorization level one, which, in conjunction with the proper backdoor application, gives minimum access to settings in the electronic device 100. Note that selection of the off bar 610 allows no access to internal settings within the device.

Correspondingly, selection of the bar 630 represents a selection of authorization level four, which, in conjunction with the proper backdoor application gives maximum access to settings in the electronic device 100. For example, an authorization level of four can allow a user of the proper backdoor application to change the device's identification number in an effort to clone another device, or set different tuning settings on the device 100. Authorization levels two and three represent intermediary access levels.

The backdoor applications or test applications also have been assigned various authorization levels using the same authorization system as shown in FIG. 6. In one embodiment of the present invention, the electronic device 100 can only run backdoor applications that have authorization levels equal to or lower than the authorization level assigned to the electronic device. Thus, if a device 100 is assigned an authorization level of three, giving close to maximum access to the settings within the electronic device 100, then the device can run backdoor applications that have been assigned authorization levels of three or lower. In that example, the electronic device 100 cannot run a backdoor application that has an authorization level of four.

FIG. 7 illustrates a flow chart of steps in accordance with the process 700 used to enable an electronic device to run controlled applications, in accordance with one embodiment of the present invention. Process 700 uses an enabler application for enabling the electronic device. Process 700 begins with step 710, where the enabler application is loaded onto the electronic device.

In step 720, the enabler application locates and reads the serial number associated with the electronic device. As discussed previously, the serial number is a number unique to the device and stored in a secure area of memory of the device upon manufacture. In step 730, the enabler application copies the serial number, forming a copied serial number that is identical to the serial number that is stored in the electronic device.

In step 740 of process 700, the electronic device is assigned with a pre-determined authorization level. The authorization level allows a properly enabled device to run applications with authorization levels of equal or lower priority (e.g., applications with authorization levels of equal or lower value).

In step 750 of process 700, one record is created that contains both the copied serial number and the authorization level of the electronic device. This record is then encrypted in step 760, forming an encrypted record.

In step 770, the enabler application stores the encrypted record that contains the copied serial number and the authorization level of the electronic device in an area of memory in the electronic device. In one embodiment, the enabler application stores the encrypted record as a locked flash memory.

The final step in process 700 includes removing the enabler application in step 780. It is important to remove the enabler application from the electronic device in order to maintain the integrity of the security technique as described in embodiments of the present invention. Should the enabler application be leaked, any device could be enabled to run any backdoor application that follows the same security technique implemented in embodiments of the present invention.

FIG. 8 illustrates a flow chart of steps in accordance with a computer implemented process 800 for verifying that a backdoor device has been correctly enabled to run a specific backdoor or test application, in accordance with an embodiment of the present invention. Process 800 is used by backdoor applications that have controlled attributes to verify that an electronic device has been correctly enabled and that the device also satisfies the necessary authorization level.

Process 800 begins with step 810, by executing the backdoor application on the electronic device. Upon execution, the backdoor application will attempt to locate an encrypted record that has been placed on the electronic device by an enabler application, in step 815. In one embodiment, if the device has been properly enabled by an enabling application, an encrypted serial number will have been stored in an area of flash memory on the electronic device.

Step 815 presents a condition. If an encrypted record has been located, then process 800 proceeds to step 820. However, if an encrypted record has not been located, then process 800 proceeds to step 875. In step 875, the backdoor application will summarily abort or exit from the electronic device. In another embodiment, the backdoor application will deny access to the controlled attributes of the backdoor application and allow the electronic device to run the uncontrolled attributes of the backdoor application.

Referring back to step 815, if an encrypted record has been located, the backdoor application then attempts to decrypt the encrypted record in step 820. After a successful decryption, the copied serial number and the authorization level of the electronic device can be accessed and processed in order to verify the enablement of the electronic device. The backdoor application uses an encryption/decryption protocol that substantially conforms to the same encryption/decryption protocol used by the enabler application of process 700.

After decryption of the encrypted record, process 800 proceeds to step 830 to present another condition. If the encrypted record has been successfully decrypted, the process 800 proceeds to step 835. However, if the encrypted record has not been successfully decrypted, process 800 proceeds to step 875, where the backdoor application summarily aborts or denies access to its controlled attributes.

Returning back to step 830, if the encrypted record has been successfully decrypted, the backdoor application reads the copied serial number that is located in the encrypted record in step 835. Process 800 then proceeds to step 840 to fetch the serial number of the electronic device. The serial number is unique to the device and placed in a secure area of memory upon manufacturing the device.

In step 845, the backdoor application compares the serial number of the device with the copied serial number to detect invalidly enabled devices. Presumably, if the electronic device has been properly enabled by an enabler application, the copied serial number that is stored in an encrypted record located on the device will be identical to the serial number of the electronic device.

In a futile attempt to artificially enable a device, a user cannot copy or clone a validly enabled device just by copying the cloned device's serial number. In this case, the copying device will have a copied serial number associated with the cloned device and a serial number associated with the copying device: the copied serial number and the serial number will not match.

Process 800, thus, proceeds to step 850 to present another condition. In step 850, if the copied serial number and the serial number of the electronic device, originally placed on the device upon manufacture, match, then process 800 proceeds to step 855. However, if the serial number and the copied serial number do not match, then, process 800 proceeds to step 875, where the backdoor application summarily aborts or denies access to its controlled attributes.

Returning to step 855, process 800 reads the authorization level in the encrypted record. This encrypted record has been successfully decrypted previously in step 820. Also, the authorization level has been previously assigned to the electronic device. This authorization level allows the electronic device to run controlled applications having authorization levels of equal or lower priority: having equal or lower values.

In step 860, the backdoor application compares the authorization level that is assigned to the electronic device with the authorization level that has been assigned to the backdoor application. Each backdoor application has been assigned its own authorization level that controls access to internal settings associated with the electronic device that runs the backdoor application.

After comparing the two authorization levels in step 860, process 800 proceeds to step 865 to present a final condition. If the authorization level assigned to the electronic device is of an equal or higher authorization level than that assigned to the backdoor application, then process 800 proceeds to step 870. However, if the authorization level assigned to the electronic device is lower than the authorization level assigned to the backdoor application, process 800 proceeds to step 875 where the backdoor application summarily aborts or denies access to its controlled attributes. Note that if any of the conditions fail in steps 815, 830, 850, or 865, then the backdoor application summarily aborts or denies access to its controlled attributes.

Returning to step 870, the backdoor application has verified that the electronic device has been correctly enabled with the necessary authorization level and allows access to the controlled attributes of the backdoor application. Thus, a user can implement the controlled attributes of the backdoor application via the enabled electronic device.

While the methods of embodiments illustrated in processes 700 and 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of process 700 and 800 may be implemented utilizing processor 101, RAM memory 102, and ROM memory 103, as shown in FIG. 4. Furthermore, other types of memory storage can be utilized to accomplish the aforementioned such as a hard drive, a CD ROM, flash memory, or any compact integrated circuit memory storage device.

The preferred embodiment of the present invention, a method and system for a security technique that enables an electronic device to run controlled test applications, is thus described. While the present invention has been described in particular embodiments, it should be appreciated that the present invention should not be construed as limited by such embodiments, but rather construed according to the below claims.

What is claimed is:

1. A secured electronic system comprising:
   a backdoor enabled electronic device having a stored serial number and an assigned device authorization level for access to controlled attributes;
   a single encrypted record of a serial number for said electronic device and the device authorization level for the access by said electronic device to controlled attributes;
   a decryption structure for decrypting said single encrypted record to provide representations of a decrypted serial number for said electronic device and representations of a decrypted device authorization level for said electronic device;

a serial number comparator for testing said decrypted serial number for said electronic device with said stored serial number to control enablement of said electronic device;

an authorization level comparator for testing said representations of a decrypted device authorization level for an enabled electronic device with an authorization level of a backdoor application to control access to said controlled attributes and to allow access to said controlled attributes when said decrypted device authorization level for said electronic device is of an equal or higher authorization level than the authorization level of the backdoor application.

2. A system according to claim 1 wherein said single encrypted record is stored on the electronic device.

3. A system according to claim 2 wherein said encrypted record is stored as a locked flash record.

4. A system according to claim 1 wherein said electronic device receives said stored serial number at the time of manufacture.

5. A system according to claim 1 wherein said electronic device comprises a personal digital assistant.

6. A system according to claim 5 wherein said electronic device includes internet capabilities.

7. A system according to claim 5 wherein said electronic device includes a capability to transmit and receive data in a wireless interface.

8. A process for enabling backdoor enabled electronic device having a stored serial number and an assigned device authorization level for access to controlled attributes, comprising the steps of:

storing on the electronic device, a single encrypted record of a serial number and the device authorization level of the electronic device;

decrypting said single encrypted record to provide representations of a decrypted serial number for said electronic device and representations of a decrypted device authorization level;

comparing said decrypted serial number for said electronic device with said stored serial number to control enablement of said electronic device; and testing said representations of a decrypted device authorization level of the electronic device against an authorization level of a backdoor application for access to controlled attributes;

wherein in accordance with said comparing step, access is allowed when said decrypted device authorization level for said electronic device is of an equal or higher authorization level than the authorization level of the backdoor application.

9. A process according to claim 8 wherein said encrypted record is stored as a locked flash record.

10. A process according to claim 8 wherein said step of storing on the electronic device is performed at the time of manufacture of said electronic device.

* * * * *